United States Patent [19]

Fulkerson

[11] 4,032,801
[45] June 28, 1977

[54] ELECTROMAGNETIC RADIATION INTENSITY COMPARATOR APPARATUS

[75] Inventor: David E. Fulkerson, Minnetonka, Minn.

[73] Assignee: Honeywell Inc., Minneapolis, Minn.

[22] Filed: Oct. 10, 1975

[21] Appl. No.: 621,315

[52] U.S. Cl. .............................. 307/311; 307/355; 307/362; 330/30 D; 352/140; 354/24; 354/25; 356/4

[51] Int. Cl.² ...................... G03B 7/08; G03B 3/00; H03F 3/45

[58] Field of Search ........ 307/235 R, 235 F, 235 J, 307/235 K, 235 H, 235 T, 297, 311; 352/140; 354/24, 25, 31; 356/4; 330/30 D

[56] References Cited

UNITED STATES PATENTS

| | | | |
|---|---|---|---|
| 3,292,098 | 12/1966 | Bensing | 330/69 |
| 3,424,908 | 1/1969 | Sitter | 250/206 |
| 3,435,257 | 3/1969 | Lawrie, Jr. | 307/289 |
| 3,473,036 | 10/1969 | Marcus | 307/311 X |
| 3,638,050 | 4/1970 | Harp | 307/311 |
| 3,751,154 | 8/1973 | Frazee | 356/4 X |
| 3,757,137 | 9/1973 | Ahmed | 307/235 T |
| 3,761,183 | 9/1973 | Yuasa et al. | 356/175 |
| 3,770,967 | 11/1973 | Hanna et al. | 307/311 X |
| 3,779,142 | 1/1973 | Yata et al. | 315/156 X |
| 3,822,387 | 7/1974 | Mulder | 307/311 X |
| 3,877,039 | 4/1975 | Ichinohe et al. | 354/24 |
| 3,896,456 | 7/1975 | Toyoda | 307/235 H X |

Primary Examiner—John S. Heyman
Assistant Examiner—L. N. Anagnos
Attorney, Agent, or Firm—Theodore F. Neils

[57] ABSTRACT

An electromagnetic radiation intensity comparator is disclosed for providing an indication of differences between electromagnetic radiation intensities occurring at different photodetectors.

13 Claims, 4 Drawing Figures

ELECTROMAGNETIC RADIATION INTENSITY COMPARATOR APPARATUS

BACKGROUND OF THE INVENTION

The invention herein relates to precision electromagnetic radiation intensity comparators and, more particularly, to monolithic integrated circuit electromagnetic radiation comparators for use in cameras or other systems with electromagnetic radiation input signals. In these uses the integrated circuit may also, of course, contain further signal processing circuitry.

There are a number of system situations in which it is required that differences in electromagnetic radiation intensity occurring at two or more sources be determined as a system input. For instance, a camera which is to use incident light from a scene desired to be photographed to adjust the camera focus requires, in one approach, that a correlation be performed between two views of the scene desired to be photographed. Local differences in light intensity in the images corresponding to these two views are indicative of how far from focus that camera currently is and so signals obtained from these images that are related to these differences can be used to automatically bring the camera into focus. In another instance, system electrical signals from various sources in the system can be sensed through optical couplers to provide nearly perfect isolation between the signal sources and the sensing portion of the system. Differences between the intensity of these signals as coupled through photodetectors will, in many instances, be of substantial interest in determining or furthering one or more system functions.

There are substantial difficulties in obtaining an indication of such electromagnetic intensity differences, particularly when the indication must be precise. One of the reasons for this is the rather wide range of electromagnetic radiation intensities often encountered by such difference determining systems, i.e. comparator systems. A camera system, typically, will encounter light conditions ranging over several orders of magnitude in intensity. To obtain precise differences at low light levels requires substantial amplification while carefully avoiding any noise pick up in the signal system. Yet at high light levels, the system must again provide a precise indication of differences, at least where the differences are not too great, without saturating the measuring system. Further, such measuring systems must often operate over a wide range of environmental conditions in obtaining the desired measurements and so must be able to provide precise difference indications throughout this range of conditions.

Electromagnetic radiation intensity comparators, particularly for light, have been provided heretofore but usually using discrete or partially monolithic integrated circuit techniques. Such embodiments, however, are subject to noise signal pick-up for low level electromagnetic radiation inputs and to thermal mismatch problems which cause similarly situated comparator system components to perform differently from one another. These lead to errors which are too large to be tolerated in a precision system where differences between various light intensities must be known to a very few percentage points of the light intensities being sensed and over a wide range of light intensities and operating conditions.

SUMMARY OF THE INVENTION

An electromagnetic radiation intensity comparator is disclosed for precisely comparing electromagnetic radiation intensities occurring at two or more photodiodes over a wide range of electromagnetic radiation intensities. A limited range output signal indicative of such intensity differences is provided with respect to each pair of photodiodes which reaches a maximum magnitude whenever the intensity differences become sufficiently large. This limited range output signal is particularly useful when arrays of photodiodes are used containing several photodiode pairs so that large intensity differences between a particular pair of photodiodes does not lead to an output signal contribution which dominates the contributions from other photodiode pair output signals either in same composite output signal or in some further signal processing circuitry. The comparator disclosed is especially suited for monolithic integrated circuit construction, a construction which permits low noise pick-up and precise system operation over a wide range of temperature.

An absolute value circuit is also disclosed, also especially suited for monolithic integrated circuit construction, to which the photodiode pair output signals may be supplied so that the magnitudes of intensity differences alone are available without regard to the polarity of these differences.

DESCRIPTION OF THE PREFERRED EMBODIMENTS

Figure 1:
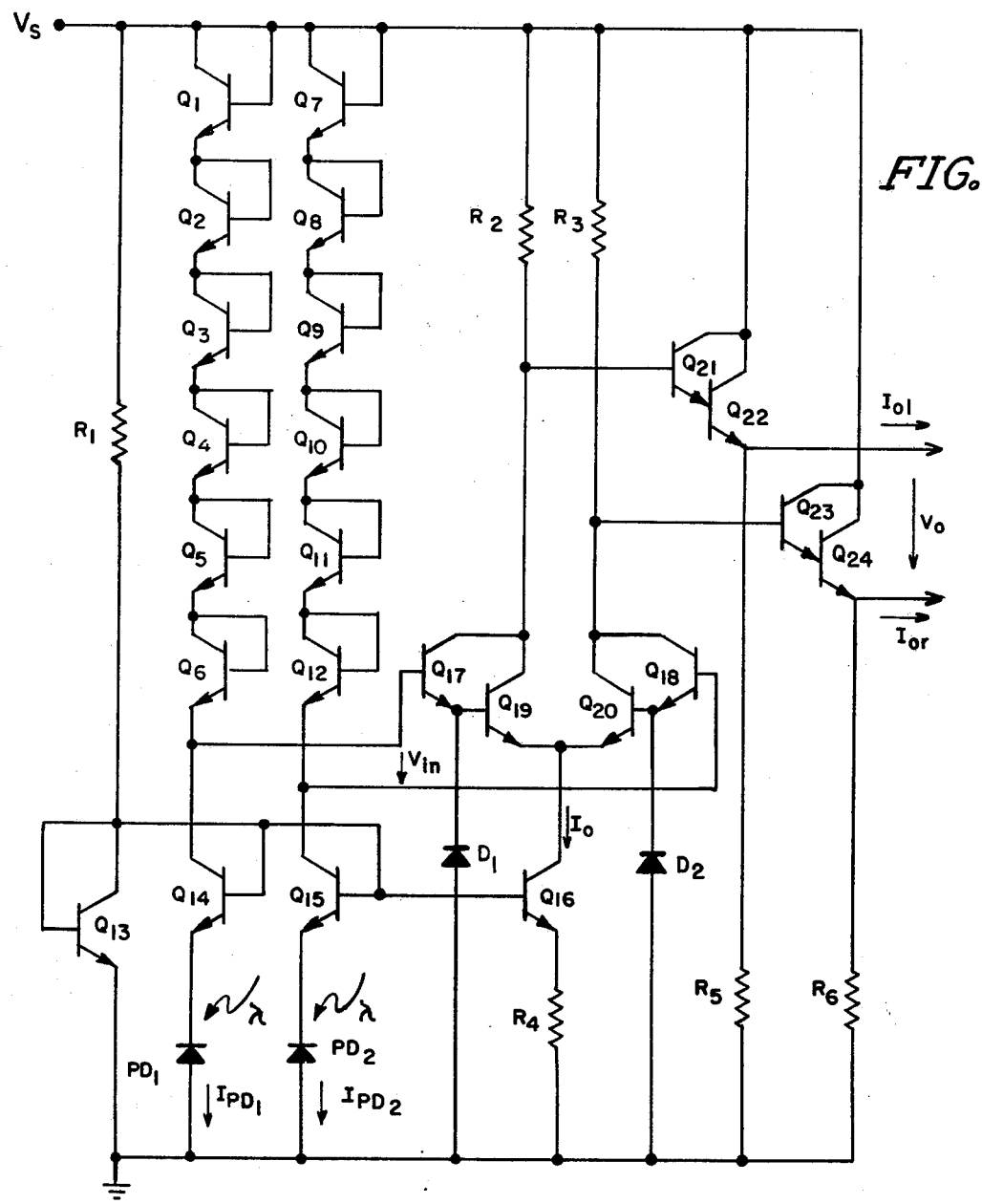
FIG. 1 presents a circuit schematic diagram concerning the present invention.

FIG. 1 shows a schematic circuit diagram of a circuit primarily for monolithic integrated circuit construction which can provide an output voltage which is proportional to the logarithm of the ratio of the intensities of light impinging on photodiodes $PD_1$ and $PD_2$ that is, the logarithm of the ratio of the light intensities occurring at these photodiodes. The circuit is capable of providing an output signal indication which is within about three percent typically of the actual ratio of light intensities. This performance is achieved while operating over a range of tempertures from 0° F to 120° F and over a range of light intensities extending over three to four orders of magnitude, including light intensities so small as to give rise to only nanoamps of current in the photodiodes.

Photodiodes are chosen to be the light sensors because photodiodes of high quality can be constructed of silicon material and they can be formed readily in monolithic integrated circuit constructions. Finally, photodiodes are desirable light sensors because the photocurrents generted by light impinging thereon are very close to being linearly related to the intensity of that light and because that light intensity-photocurrent relationship holds very nearly independent of temperature over a wide range of temperatures.

Each of the photodiodes $PD_1$ and $PD_2$ is biased to an operating point of approximately zero volts, having at most a slight reverse bias of 50 to 200 millivolts thereacross. This operating point is chosen for two reasons. First, the leakage current of the reversed biased pn junction in the photodiode, i.e. the photodiode dark current, provides an unwanted photodiode output signal unrelated to light intensity occurring thereat and this leakage current can be minimized by using a near zero bias voltage. Secondly, the photodiodes $PD_1$ and $PD_2$ must perform very nearly identically in that each provide as nearly as possible the same output current when each has light of equal intensity occurring thereat. This matching of performance is improved by near-zero biasing.

Figure 2:
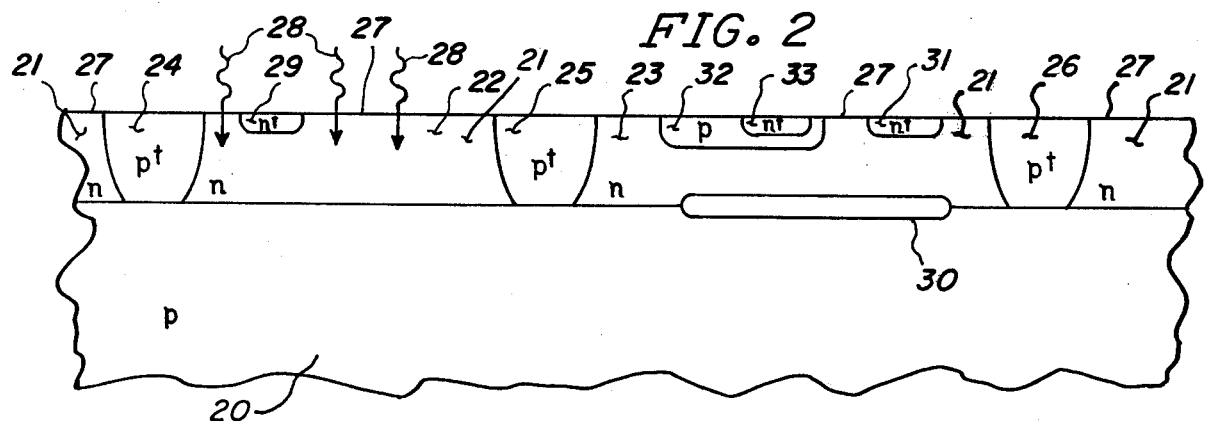
FIG. 2 provides an indication of the monolithic integrated circuit construction for a portion of the present invention, FIG. 3 provides another circuit schematic diagram concerning the present invention.

The general construction of the photodiodes is shown in FIG. 2. There is shown a truncated p-type silicon substrate, 20, having a 2 to 5 $\Omega$-cm resistivity which, in turn, has thereon an epitaxially grown n-type silicon layer, 21, having approximately a 1.5 $\Omega$-cm resistivity. Two electrically isolated regions, 22 and 23, are shown out of many typically provided in a monolithic integrated circuit. These regions are isolated by pn semiconductor junctions which are formed between isolated regions 22 and 23, on the one hand, and substrate 20 and diffused isolating regions, 24, 25 and 26 on the other.

Isolated region 22 serves as the cathode for one of the photodiodes of FIG. 1. The pn semiconductor junction surrounding isolated region 22 is the semiconductor junction required for a photodiode performance characteristic. Substrate 20 and isolating regions 24 and 25 serve as the anode of the photodiode.

The photodiodes used in the circuit of FIG. 1 must be quite large and so isolated region 22 is quite large by monolithic integrated circuit chip standards, being on the order of 12 mils by 40 mils. This rather large size is required to provide a sufficient photodiode output current for incident light, 28, of low intensity occurring at the epitaxial layer surface, 27, where this surface intersects isolated region 22. Further, the geometrical shapes of the photodiodes $PD_1$ and $PD_2$ must be very closely similar to one another to ensure matched performance. Large area photodiodes aid in reaching this goal as small errors in geometrical outlines become less and less significant as the photodiode surface areas increase in size.

The monolithic integrated circuit construction shown in FIG. 2 shows only typical components rather than the complete monolithic integrated circuit, and has been further abbreviated by omitting insulating layers and the interconnection metallization system present within a complete monolithic integrated circuit. The monolithic integrated circuit portion shown, as well as the rest of the monolithic integrated circuit, are made by conventional monolithic integrated circuit techniques and the use of insulating layers and an interconnection metallization system are well known in such techniques. Electrical contacts for the photodiode would be made by the aluminum used in conventional interconnection metallization networks with an ohmic contact being made to a small diffused contact region, 29, to seve as the cathode contact. Another ohmic contact is made to substrate 20 or any of the isolating regions 24 through 26, preferably one of the nearest isolating regions 24 or 25, to serve as the anode contact.

Returning now to FIG. 1, the biasing of the photodiodes $PD_1$ and $PD_2$ is accomplished by bipolar transistors $Q_{13}$, $Q_{14}$, $Q_{15}$ and resistor $R_1$. Bipolar transistor $Q_{13}$ serves as a voltage reference diode with a voltage value thereacross determined by the transistor base-emitter diode characteristic and the current supplied therethrough by resistor $R_1$ via the supply voltage, $V_s$. $R_1$ is approximately 100,000 $\Omega$ in resistance value. The current through $Q_{13}$ is considerably greater than that through either $Q_{14}$ or $Q_{15}$ and so the voltage drop across diode-connected transistor $Q_{13}$ will always be slightly greater than that occurring across the base-emitter junctions of bipolar transistors $Q_{14}$ and $Q_{15}$. The additional voltage dropped across transistor $Q_{13}$ beyond that which is dropped across the base-emitter junctions of transistors $Q_{14}$ and $Q_{15}$ will appear across photodiodes $PD_1$ and $PD_2$, a voltage drop which will always be quite small if the characteristics of the transistors $Q_{13}$ through $Q_{15}$ are well matched. As earlier stated, this value will be approximately 50 to 200 millivolts although this will vary with varying photocurrents.

Bipolar transistors $Q_{14}$ and $Q_{15}$ serve a further purpose. They each act as a current translator, translating the photocurrent generated in the photodiode occurring in the emitter circuit of each transistor to an approximately equal current in the collector circuit of that transistor, such that the translated current or the collector current in the collector circuit of each transistor flows through the electrical load in that collector circuit. The current in the collector circuit of either $Q_{14}$ or $Q_{15}$, with both of these transistors operating in the active region, will be approximately linearly related to the current occurring in the emitter circuit of these transistors by the common base current gain, $\alpha$, of each of these transistors. In fact, as previously stated, the collector and the emitter currents in these transistors will be approximately equal for good quality transistors as $\alpha$ will then nearly have a value of unity. Again, these common base current gains must be very well matched if the circuit of FIG. 1 is to remain within the performance tolerance indicated above.

Turning again to FIG. 2, isolated region 23 contains a bipolar transistor of the kind used throughout the monolithic integrated circuit although there will be some deviations in size and characteristics among the bipolar transistors in the integrated circuit. The bipolar transistor has a buried layer region, 30, intersecting the isolated region 23 which together form the collector for the transistor. Electrical contact is made to the collector, though not shown, through an ohmic contact made by the metallization interconnection network also not shown, to collector contact region, 31, which is a heavily diffused region of $n^+$-type conductivity. A base region, 32, of p-type conductivity and an emitter region, 33, of $n^+$-type conductivity are also provided and appropriate ohmic contacts to these regions, not shown, are made by the metallization interconnection network.

Transistors $Q_{13}$ through $Q_{15}$ are all of the type shown in isolated region 23 and all, as indicated above, must be closely matched in base-emitter junction characteristics. Also, as indicated above, transistors $Q_{14}$ and $Q_{15}$ must have well matched common base current gains. This requires that the geometrical structures or shapes of these transistors, as formed in the epitaxial layer, be very closely similar to one another. Further, to achieve having each of these transistors operate similarly over the desired temperature range, they are placed in adjacent isolated regions in the monolithic integrated circuit to prevent any substantial temperature differentials from occurring therebetween. Finally, transistors $Q_{14}$ and $Q_{15}$ must each have a high common emitter current gain, $\beta$, because of the small base currents drawn by these transistors in the circuit configuration of FIG. 1. These base currents are small because of the small photocurrents occurring in the emitter circuits. The common emitter current gain must be around 20 or above at room temperature with a collector current of 2 nanoamps for proper circuit operation.

Returning again to FIG. 1, the electrical loads in the collector circuits of the current translator bipolar transistors $Q_{14}$ and $Q_{15}$ are also bipolar transistors of the type shown in isolated region 23 in FIG. 2. However, each transistor has its base and collector shorted together so that the transistor operates as a diode using its base-emitter junction to provide the diode characteristic. Thus, transistor $Q_{14}$ and transistor $Q_{15}$ each has a string of diodes, or diode-connected transistors, serving as the electrical load in the collector circuit of each of these transistors.

Once again, these diodes must have closely matched performance characteristics for proper circuit operation and so these diodes are provided in a group of adjacent isolated regions in the monolithic integrated circuit chip. The diodes are selected from this group alternately to make up each string of diodes to minimize any structure differences occurring across the monolithic integrated circuit chip itself in the region where the diodes are located. Again, closely matched temperature performance can be best achieved by grouping the diodes to eliminate temperature gradients between diodes insofar as possible. Also, by using a number of diodes random small differences in performance and construction therebetween tend to average out. Thus, the sensitivity of the voltage drop across the diode string due to random characteristic variation in each diode as a result of random variations in wafer material, masking, processing, etc. is reduced by a factor of $1/\sqrt{n}$, where $n$ is a number of diodes in a string. This occurs through the submersion of the characteristics of any given diode in a string among the characteristics of the others in the string to provide an average characteristic.

The use of a current-driven diode string, or diode-connected transistor string, i.e. placing such a string in the output circuit of a current translator, provides a logarithmic current to voltage signal conversion. This is due to a well-known diode characteristic typical of many semiconductor pn junctions which can be expressed as:

$$I_E = I_S \left( \exp \frac{qV_{BE}}{kT} - 1 \right).$$

This can be rewritten as the following when there is substantial forward bias on junction:

$$V_{BE} = \frac{kT}{q} \ln \left( \frac{I_E}{I_S} \right)$$

Here, the emitter current for one of the diodes in one of the strings, or one of the diode-connected transistors in one of the strings, is represented by $I_E$, the diode saturation current is represented by $I_S$, $k$ is Boltzmann's constant, $q$ is the electronic charge and T is the absolute temperature. The actual voltge drop across a string of diodes will be on the order of:

$$V_{string} = n \frac{kT}{q} \ln \left( \frac{I_E}{I_S} \right),$$

because of the $n$ diodes in a string.

A detailed analysis of this first stage of the circuit shown in FIG. 1 yields a considerably more complex expression to be used when all of the sources of error are to be taken into account for the circuit of FIG. 1 for the purpose of determining an error budget for each circuit stage. Such a budget then determines the matching requirements, compensation requirements and other steps which must be taken in the design of that stage in order to remain within the total error allowed for the circuit of FIG. 1. The detailed analysis is undertaken using the total photodiode currents as the FIG. 1 circuit inputs rather than the light intensities since there is a clear linear relationship between light intensity and photodiode current which is essentially temperature independent.

The expressions set out below result for the differential voltage appearing at the collectors of the current translator bipolar transistors $Q_{14}$ and $Q_{15}$. This is a voltage which in practice cannot be measured because the introduction of any kind of a probe, despite a high probe impedance, badly upsets the circuit operation due to the extremely low currents involved. The current, $I_o$, sinked by the current sink, formed with transistors $Q_{13}$ and $Q_{16}$ along with resistors $R_1$ and $R_4$, is taken as a separately determined parameter. The expressions for $V_{in}$, i.e. the difference in collector voltage between the collectors of transistors $Q_{14}$ and $Q_{15}$, is:

$$V_{in} = \frac{kT}{q} \ln \left[ \left( \frac{I_{PD2}\alpha_{15} + (1 - \alpha_{18})(1 - \alpha_{20}) I_{E20}}{I_{PD1}\alpha_{14} + (1 - \alpha_{17})(1 - \alpha_{19}) I_{E19}} \right)^6 \frac{I_{S1}I_{S2}I_{S3}I_{S4}I_{S5}I_{S6}}{I_{S7}I_{S8}I_{S9}I_{S10}I_{S11}I_{12}} \right]$$

with $$I_{E19} = \frac{I_o}{1 + \left( \frac{I_{S18}I_{S20}}{I_{S17}I_{S19}} \frac{1 - \alpha_{19}}{1 - \alpha_{20}} \right)^{1/2} \exp - \frac{V_{in}q}{2kT}}$$

and $$I_{E20} = \frac{I_o}{1 + \left( \frac{I_{S17}I_{S19}}{I_{S18}I_{S20}} \frac{1 - \alpha_{20}}{1 - \alpha_{19}} \right)^{1/2} \exp \frac{V_{in}q}{2kT}}$$

Here, the photodiode currents are represented by $I_{PD1}$ and $I_{PD2}$, the transistor common base current gains are represented by $\alpha_m$ where $m$ is the number of the transistor concerned, the saturation current of the base-emitter junctions of the transistors is represented by $I_{Sm}$ where $m$ is the number of the transistor concerned, the emitter currents of the transistor are represented by $I_{Em}$ where $m$ is the number of the transistor concerned, $k$ is Boltzmann's constant, $q$ is the electronic charge and T represents the absolute temperature.

As the preceding equations indicate, the collectors of $Q_{14}$ and $Q_{15}$, between which $V_{in}$ appears, are loaded by a differential amplifier comprising bipolar transistors $Q_{16}$ through $Q_{20}$ and in addition, resistors $R_2$ through $R_4$. The very sensitive nature of the loading of collectors $Q_{14}$ and $Q_{15}$, indicated above to preclude measurements made at these points by external probes, also requires that the loading by the differential amplifier be very slight. This is achieved by using two pairs of Darlington-connected transistors to form the differential amplifier where these transistor pairs have a Darlington pair gain product of approximately 6000 or more at room temperature with a collector current for the pair of 1 microamp.

Furthermore, the performance of the two Darlington-connected pairs must be very well matched and so the four transistors $Q_{17}$ through $Q_{20}$ forming these pairs are constructed geometrically very similarly to one another and located in quadrants of a square so that the transistors are all adjacent to one another in the monolithic integrated circuit. Transistors in diagonally opposite quadrants are chosen to provide the Darlington-connected pairs to improve matching between the pairs.

As previously stated, transistor $Q_{16}$ serves as a current sink for the differential amplifier. The sink current $I_o$ is determined by the resistor in the emitter circuit of transistor $Q_{16}$, that is resistor $R_4$ of approximately 40k$\Omega$ and bipolar transistor $Q_{13}$ and resistor $R_1$ serving as a convenient voltage reference along with the base-emitter junction of transistor $Q_{16}$. Since better temperature performance can be obtained when transistors $Q_{13}$ and $Q_{16}$ are adjacent to one another, transistor $Q_{16}$ is constructed in the monolithic integrated circuit adjacent to $Q_{13}$ so that transistors $Q_{13}$ through $Q_{16}$ are also formed in quadrants of a square. This type of current sink is also relatively independent of supply voltage $V_s$.

The differential amplifier has collector load resistors $R_2$ and $R_3$. These resistors must again have a closely matched performance and so are split into the two series resistors with all four of the resistors formed adjacent to one another as quadrants in a square in the monolithic integrated circuit construction. Resistors from diagonal quadrants in this are connected in series to make up resistors $R_2$ and $R_3$ such that each collector load thereby has a resistive load of approximately 100k$\Omega$.

A differential amplifier that is not part of a feedback circuit, as is often the case is using an operational amplifier which is commonly employed in analog integrated circuits to provide gain and loading, is chosen to load the collectors of transistors $Q_{14}$ and $Q_{15}$. This differential amplifier is used not only to obtain both differential operation with respect to $V_{in}$ and a high input impedance, but also is used open loop to obtain the differential amplifier limiting characteristics for larger values of $V_{in}$. The output of the differential amplifiers, $V_{od}$, does not further increase significantly in response to increases in $V_{in}$ after the absolute value of $V_{in}$ exceeds approximately 100 millivolts. However, for absolute voltage values substantially less than this, the differential output voltage of the differential amplifier, $V_{od}$, is approximately linearly related to $V_{in}$. That is, the differential amplifier has a maximum and minimum output signal limits beyond which $V_{od}$ does not range.

Hence, at some point, greater and greater light intensity differences occurring at photodiodes $PD_1$ and $PD_2$ will not result in increasing or decreasing $V_{od}$, as the case may be, beyond these output signal limits.

In the packaging of the monolithic integrated circuit, portions thereof including the photodiodes $PD_1$ and $PD_2$ must not be entirely enclosed so that they are exposed to that light concerning which an intensity comparison is to be made. Desirably, the remainder of the monolithic integrated circuit will be shielded from that light. However, this shielding, if it is to be provided by the chip package, usually cannot be made complete because of the small integrated circuit chip dimensions and often cannot be conveniently provided at all by a packaging means. The light getting through to the remainder of the chip despite other shielding provisions will cause photocurrents to be developed in all the pn junctions illuminated including the transistor junctions forming the Darlington-connected pairs in the differential amplifier.

This is a particularly undesirable phenomenon with respect to the performance of the differential amplifier circuit because currents at the bases of $Q_{19}$ and $Q_{20}$ have no alternative paths and because transistors $Q_{19}$ and $Q_{20}$ operate at low base currents. Diodes $D_1$ and $D_2$ are therefore provided to sink the photocurrents developed across the collector-base semiconductor junctions of transistors $Q_{19}$ and $Q_{20}$. Diodes $D_1$ and $D_2$ are formed adjacent to transistors $Q_{19}$ and $Q_{20}$ so as to match the performance of these transistors and to be similarly illuminated. Diodes $D_1$ and $D_2$ are structurally formed just like transistors $Q_{19}$ and $Q_{20}$ with the exception of eliminating the emitter region. Thus, diode $D_1$ and $D_2$ are formed by collector-base junctions which are very similar to the collector-base junctions formed in transistors $Q_{19}$ and $Q_{20}$, although they have a somewhat larger junction area to achieve certain photocurrent sinking. Approximately the same photocurrents or somewhat larger photocurrents are developed in diodes $D_1$ and $D_2$ as in the collector-base junctions of transistors $Q_{19}$ and $Q_{20}$. Diodes $D_1$ and $D_2$ remove the photocurrents developed in the collector-base junctions of transistors $Q_{19}$ and $Q_{20}$ from the base current of these transistors so these photocurrents do not affect the performance of the differential amplifier.

An analytical expression can be obtained for differential amplifier output voltage signal $V_{od}$ occurring between the collectors of $Q_{17}$ and $Q_{19}$, on the one hand, and the collectors of $Q_{18}$ and $Q_{20}$, on the other hand, which is required in error budget determinations. The expression is as follows:

$$V_{od} = I_o \left[ \frac{(\alpha_{18} + \alpha_{20} - \alpha_{18}\alpha_{20})R_3}{1 + \left(\frac{I_{S17}I_{S19}}{I_{S18}I_{S20}} \frac{1-\alpha_{20}}{1-\alpha_{19}}\right)^{1/2} \exp \frac{V_{in}q}{2kT}} \right.$$

$$\left. - \frac{(\alpha_{17} + \alpha_{19} - \alpha_{17}\alpha_{19})R_2}{1 + \left(\frac{I_{S18}I_{S20}}{I_{S17}I_{S19}} \frac{1-\alpha_{19}}{1-\alpha_{20}}\right)^{1/2} \exp -\frac{V_{in}q}{2kT}} \right].$$

The symbols in the immediately preceding equation parallel those in the earlier equations. $V_{in}$ is determined from the three equations preceding the latter one to permit determination of $V_{od}$ in this last equation. No account of diodes $D_1$ and $D_2$ is taken in this last equation.

Again, because of the very sensitive loading situation concerning the collectors of transistors $Q_{14}$ and $Q_{15}$, the impedance which loads the differential amplifier must be very high and very well matched on either side of the differential amplifier output if loading problems are not to be reflected back through the differential amplifier to the collectors of $Q_{14}$ and $Q_{15}$. To achieve this, a Darlington-connected pair of bipolar transistors is provided in an emitter follower circuit on each side of the differential amplifier output so that each emitter follower circuit serves as an impedance transformer. That is, each emitter follower circuit has a high input impedance and a relatively low output impedance for driving further circuits to eliminate any significant loading of $Q_{14}$ and $Q_{15}$ collectors due to the loading of these further circuits being reflected back.

Again, the transistors of the first Darlington-connected pair, $Q_{21}$ and $Q_{22}$, and the transistors of the other Darlington-connected pair, $Q_{23}$ and $Q_{24}$, must be well matched in performance. Therefore, bipolar transistors $Q_{21}$ through $Q_{24}$ are all constructed to be very similar to one another and located adjacent to one another in the quadrants of a square. Each Darlington-connected pair is formed by two transistors taken from along a diagonal in this square. These transistor pairs also have a Darlington pair gain product of about 10,000 or more at room temperature with a collector output for the pair of 50 microamps.

The emitter follower output load resistors, $R_5$ and $R_6$, also must be well matched and so are provided adjacent to one another in the monolithic integrated circuit construction. Each has a resistance value of approximately 50 kΩ.

Expressions for the operation of the emitter follower circuits cannot be completely determined without knowing the input electrical characteristics of the further circuits to be driven. In general, these will not be known and so are represented in FIG. 1 as $I_{ol}$ and $I_{or}$. $V_o$, the FIG. 1 circuit differential output voltage, is logarithmically related to the photodiode currents $I_{PD1}$ and $I_{PD2}$ by the following equations, and by the preceding equations, where the current loads for the following stage, $I_{ol}$ and $I_{or}$, are included:

$$V_o = V_{od} + \frac{kT}{q}\left[\ln \frac{(1-\alpha_{24})I^b_{S24}}{(1-\alpha_{22})I^b_{S22}} \cdot \frac{I_{S21}I_{S22}}{I_{S23}I_{S24}}\right]$$

where $$I_{S22}R_5 + \frac{kT}{q}\ln \frac{(1-\alpha_{22})I^b_{S22}}{I_{S21}I_{S22}} =$$

$$V_o + I_{ol}R_5 + \frac{R_2I_o(\alpha_{17} + \alpha_{19} - \alpha_{17}\alpha_{19})}{1 + \left(\frac{I_{S18}I_{S20}}{I_{S17}I_{S19}} \cdot \frac{1-\alpha_{19}}{1-\alpha_{20}}\right)^{1/2} \exp -\frac{V_{in}q}{2kT}}$$

and $$I_{S24}R_6 + \frac{kT}{q}\ln \frac{(1-\alpha_{24})I^b_{S24}}{I_{S23}I_{S24}} =$$

$$V_o + I_{or}R_6 + \frac{R_3I_o(\alpha_{18} + \alpha_{20} - \alpha_{18}\alpha_{20})}{1 + \left(\frac{I_{S17}I_{S19}}{I_{S18}I_{S20}} \cdot \frac{1-\alpha_{20}}{1-\alpha_{19}}\right)^{1/2} \exp \frac{V_{in}q}{2kT}}$$

Again, the symbols in the above equations parallel those in the preceding equations.

From the foregoing equations representing the performance of the circuits in FIG. 1, the critical matches which must be made in the circuit stages of the monolithic integrated circuit construction can be determined. Also, the degree of mismatch which can be tolerated for a circuit stage and tradeoffs between stages can also be determined so the total circuit error tolerance limit is not exceeded. Finally, the total differential can be found with respect to temperature to determine the thermal matching required to meet circuit stage error tolerances over temperature and to determine tradeoffs between the stages. Performance matching requirements indicated above for various components in various circuit stages of the monolithic integrated circuit are requirememts which are reflected by the foregoing equations.

Figure 3:
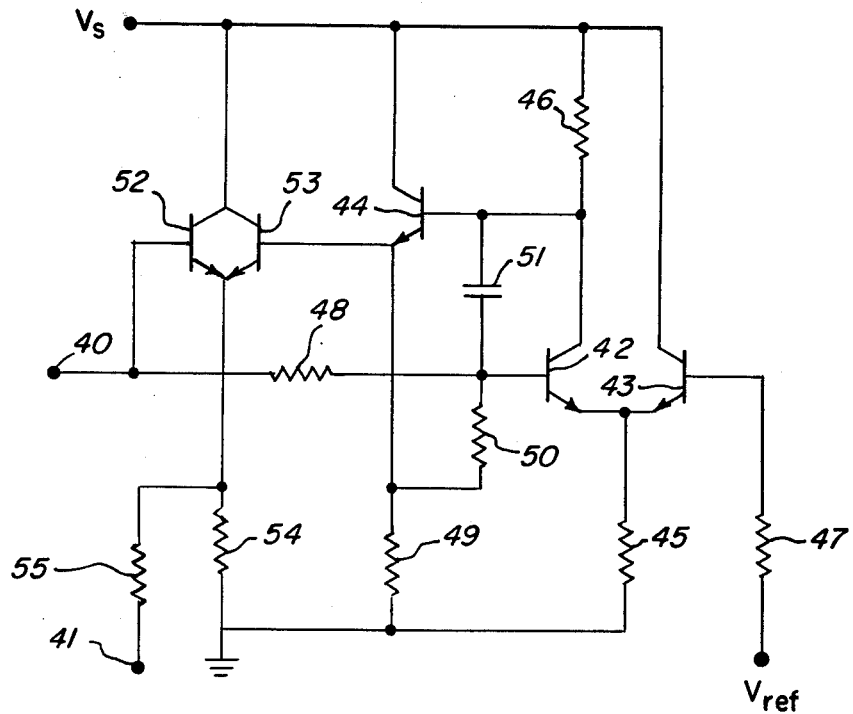

The signal at the output of FIG. 1, $V_o$, can be either positive or negative depending on which photodiode, $PD_1$ or $PD_2$, has the greater intensity falling upon it. However, for comparison purposes, quite often it is desirable to make only a magnitude comparison which is considerably facilitated if the signals representing the difference in light intensities occurring at pairs of photodiodes have just one polarity. This can be accomplished in the monolithic integrated circuit by use of the absolute value circuit shown in FIG. 3. The signal from circuit of FIG. 1 is applied, after amplification, to an input, 40, of the circuit of FIG. 3. The absolute value of the signal at input 40 is provided at the output, 41, although with a diode voltage drop value subtracted therefrom.

Bipolar transistors 42 and 43 form a differential amplifier which provides a polarity change in the input signal from input 40 to the output of the differential amplifier of the collector of transistor 42 which is electrically connected to an emitter follower driving transistor, 44. An emitter resistor, 45, a 25 kΩ value resistor, serves as a current sink in the differential amplifier while a collector resistor, 46, a 40 kΩ resistor, serves as a collector output load resistor for the differential amplifier. The side of the differential amplifier opposite the side electrically connected to input 40 is operated at a reference voltage through a reference voltage resistor, 47, a 10 kΩ resistor. The input 40 is connected to the differential amplifier through an input resistor, 48, also a 10 kΩ resistor.

Bipolar emitter follower transistor 44 has an output load resistor, 49, in its emitter circuit having a 20 kΩ value. The emitter follower driving stage has its output signal at the emitter of transistor 44 returned to the input of the differential amplifier by a feedback resistor, 50, a 10 kΩ resistor. The resulting feedback amplifier combination of the differential amplifier and the emitter follower driving stage containing transistor 44 is stabilized by a stabilizing capacitor, 51, a 40 pf. capacitor. This feedback amplifier combination essentially provides the input signal having its polarity reversed at the output of the emitter follower driving stage, that is at the emitter of transistor 44.

This output signal of the emitter follower driving stage at the emitter of transistor 44 and the input signal at the input 40 are both supplied to a pair of bipolar emitter follower transistors having a common output load resistor. The input signal from input 40 is supplied to the first transistor of this pair of emitter follower transistors, 52, while the signal from the emitter of transistor 44 is supplied to the other emitter follower transistor in the pair, 53. The absolute value circuit output resistor, 54, is common to both emitter follower transistors 52 and 53, as just mentioned, having a resistance value of 20 kΩ and is connected to the output 41 through a coupling resistor, 55, also having a resistance value of 20 kΩ. Whichever of the two signals, supplied to the emitter follower transistor pair 52 and 53, is positive with respect to the other, that signal will act to forward bias the corresponding one of the transistors 52 or 53 causing it to conduct a greater current than the other. For a sufficient magnitude difference between the signals supplied to transistors 52 and 53, one of the transistors will be turned off completely. Since emitter follower transistor pair 52 and 53 receives either the input signal or a polarity inverted version of the input signal, whichever of the transistors receives a positive polarity signal turning it on provides a positive polarity version of the input signal across resistor 54, that is the absolute value circuit output signal.

Figure 4:
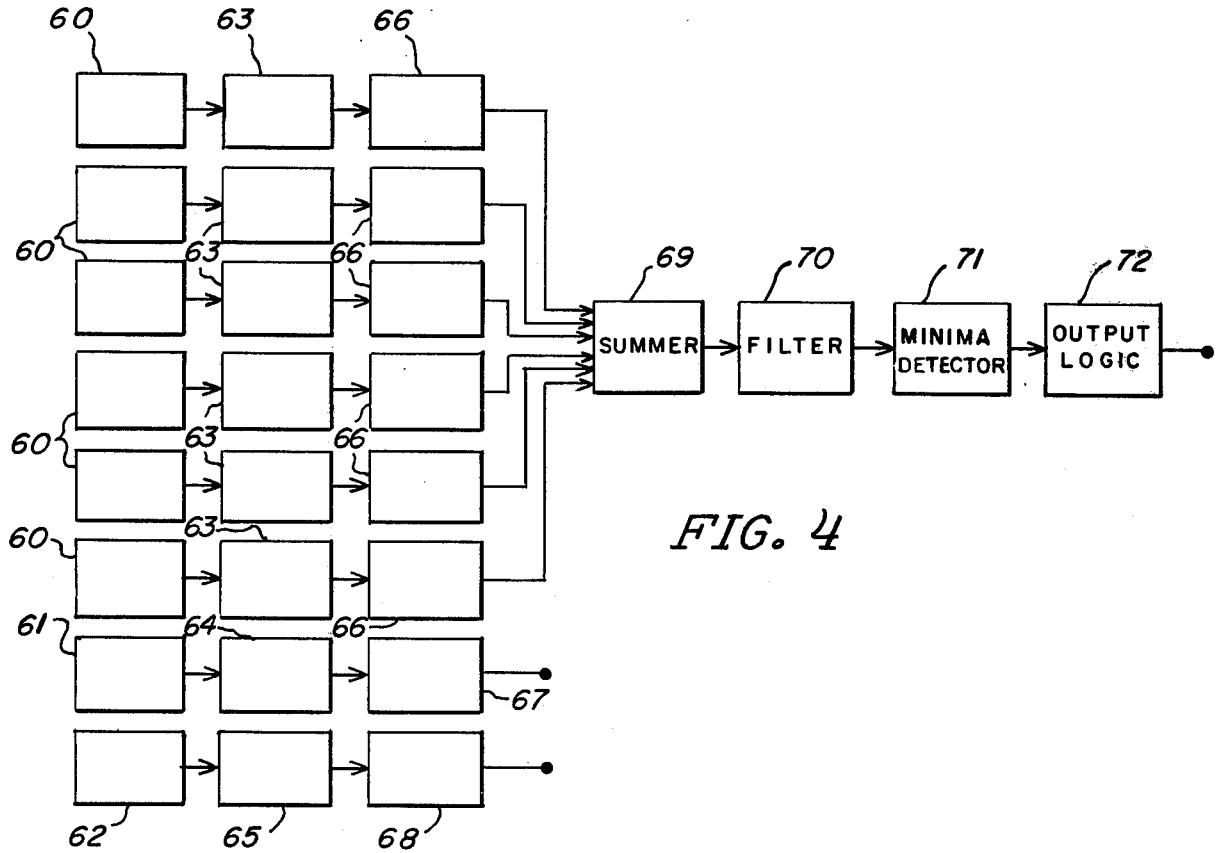
FIG. 4 represents a block diagram of a system including the present invention.

For image comparison purposes, an array of photodetectors is required to sense the various portions of the images desired to be compared. Thus, it an array of photodetectors is provided grouped into two portions, photodiode PD$_1$ would be in one portion of the array and photodiode PD$_2$ of FIG. 1 would be in the other portion of the array, both situated in the two array portions symmetrically with respect to the images to be compared. A number of FIG. 1 circuits would then be provided with a corresponding photodiode from each array portion to compare the various portions of the images occurring at each of the array groups. In other words, each photodiode would be in a FIG. 1 kind of circuit and each of the pair of photodiodes in such a circuit would be in one of the array groups. Such a system is shown in FIG. 4 where a number of FIG. 1 circuits are included in the blocks labeled 60, 61 and 62. Each of these circuits has its output supplied to amplification means 63, 64 and 65. The outputs from the amplifiers are in turn supplied to absolute value circuits, of the type shown in FIG. 3, in the blocks labeled 66, 67 and 68.

Comparison channels, comprising a block 60, a block 63 and a block 66, are shown brought together in a summing amplifier which forms the sum of all of output signals of all of the comparison channels. This is one possible manner in which an overview can be obtained of all of the differences between the two images occurring at the two array portions.

Each comparison channel output signals is, of course, just the amplified absolute value of the signal provided at the output of a block 60. Since the signal obtained from each block 60 is the difference between the logarithm of two photocurrents, each signal out of a block 60 represents the logarithm of a ratio of these two photocurrents with each photocurrent obtained from a photodiode in a separate group in the array. Hence, the sum taken represents a total related to all of the ratios of photocurrents provided by blocks labeled 60, that is the ratios of photodiode currents for each pair of photodiodes in the array selected to provide a comparison.

The comparison channels represented by the blocks 61, 64 and 67 and by the blocks 62, 65 and 68 are two comparison channels which are not selected to make a comparison of light intensities, i.e. for measuring the ratio of the photocurrents, occurring therein. Because of the high precision required in the comparison channels to obtain a precise comparison of image light intensities, a selection of useable comparison channels is ordinarily required on a monolithic integrated circuit chip because of the random variations which can occur during the processes required to provide such a chip. Thus, as shown in FIG. 4, only the best six of eight comparison channels are used. Clearly, this selection arrangement could be extended to different totals of comparison channels present and to different numbers of selected comparison channels from those that are present.

The summer, 69, is an ordinary summing amplifier of a type which can be provided in a monolithic integrated circuit by the same process techniques as used for the circuit of FIG. 1. The summer output signal represents the following equation:

$$S = \sum_{1}^{n} \left| \ln \left( \frac{I_{PD1}}{I_{PD2}} \right)_n \right|$$

The symbol $$\left( \frac{I_{PD1}}{I_{PD2}} \right)_n$$

represents the ratio of photocurrents for any one of the block 60 circuit of FIG. 4, i.e. for the $n^{th}$ block 60.

As an example of the use of the comparison channels and summer of FIG. 4, an image comparison may be performed in a system of a type providing for adjusting one or both of the images occurring at the two array groups of photodiodes. Then a point in the range of adjustment where the quantity S is a global minimum will represent the point where the intensity differences between images falling on the two different array groups are relatively the smallest. Thus, determining the global minimum of the quantity S for some kinds of systems would be of interest. Of course, other signal combinations of the output signals of the comparison channels rather than a sum of them might also be of interest as would other characteristics other than a minima of the output signal combination represented by S or some other combination.

Here, to continue the example using the signal combination represented by S in the above equation and finding the miminum of S in the range of adjustment, a filter, 70, is provided followed by a minima detector, 71. The minima detector, since it will operate on lowest trough or greatest inverted peak in the signal S, must be preceded by a filter 70 so the signal low point selected by a minima detector 71 represents an actual signal low point and not noise.

As the system adjustment is made which will affect one or both of the images falling on the two different groups of photodiodes in the array, a minimum point in the signal S is found which is detected by minima detector 71. Upon detection, a signal is sent to an output logic system, 72, which then informs an operator or stops the adjusting process to indicate the detection of a minima in the signal S indicating the images are as similar to one another as the adjusting process can make them.

The embodiments of the invention in which an exclusive property or right is claimed are defined as follows:

1. A photodiode array comparator for comparing electromagnetic radiation intensities occurring between portions of an array of photodiodes over a range of electromagnetic radiation intensities, said comparator providing a precise comparison indication of intensity differences occurring at said array portions when said intensity differences are relatively small but providing a limited comparison range to limit said comparison indication of said intensity differences when said intensity differences are relatively large, said comparator comprising:

a first portion and a second portion of said photodiode array;

a first comparator circuit comprising:

a first photodiode, as a part of said first array portion, providing a first photodiode output current and a second photodiode, as a part of said second array portion, providing a second photodiode output current substantially matched to said first photodiode output current when said first and second photodiodes are operating in similar conditions, said first photodiode output current being substantially linearly related to whatever electromagnetic radiation intensity occurs at said first photodiode within said range of electromagnetic radiation intensities and said second photodiode output current being substantially linearly related to whatever electromagnetic radiation intensity occurs at said second photodiode within said range of electromagnetic radiation intensities, a first voltage regulator means to bias said first and second photodiodes at an operating point of approximately zero volts, first and second current translators, electrically connected to said first and second photodiodes, respectively, providing first and second current translator output currents, respectively, which are substantially matched with one another when said first and second current translators are in similar opeating conditions, said first current translator output current being substantially linearly related to said first photodiode output current and said second current translator output current being substantially linearly related to said second photodiode output current, and first and second electrical loads, electrically connected to said first and second current translators, respectively, providing first and second load output voltages, respectively, which are substantially matched when said first and second electrical loads are in similar operating conditions, said first load output voltage being substantially logarithmically related to said first current translator output current and said second load output voltage being substantially logarithmically related to said second current translator output current; and a first differential amplifier having (i) a first differential amplifier output, (ii) a first differential amplifier input of high impedance electrically connected to said first load to respond to said first load output voltage, and (iii) a second differential amplifier input of high impedance electrically connected to said second load to respond to said second load output voltage, said first differential amplifier providing a first differential amplifier output signal at said first differential amplifier output which is substantially linearly related to differences between said first and second load output voltages for said first and second load output voltage differences being sufficiently small but which tends to provide one or more first output limit signals when said first and second load voltage differences are sufficiently large whereby said first differential amplifier output signal is limited in magnitude to a range defined at least in part by said first output limit signals.

2. The apparatus of claim 1 wherein said comparator also comprises:

a second comparator circuit comprising:

a third photodiode, as a part of said first array portion, providing a third photodiode output current and a fourth photodiode, as a part of said second array portion, providing a forth photodiode output current which is substantially matched to said third photodiode output current when said third and fourth photodiodes are in similar operating conditions, said third photodiode output current being substantially linearly related to whatever electromagnetic radiation intensity occurs at said third photodiode within said range of electromagnetic radiation intensities and said fourth photodiode output current being substantially linearly related to whatever electromagnetic radiation intensity occurs at said fourth photodiode within said range of electromagnetic radiation intensities, a second voltage regulator means to bias said third and fourth photodiodes to an operating point of approximately zero volts, third and fourth current translators, electrically connected to said third and fourth photodiodes, respectively, providing third and fourth current translator output currents respectively, which are substantially matched with one another when said third and fourth current translators are in similar operating conditions, said third current translator output current being substantially linearly related to said third photodiode output current and said fourth translator output current being substantially linearly related to said fourth photodiode output current, and third and fourth electrical loads, electrically connected to said third and fourth current translators, respectively, providing third and fourth load output voltages, respectively, which are substantially matched when said third and fourth electrical loads are in similar operating conditions, said third load output voltage being substantially logarithmically related to said third current translator output current and said fourth load output voltage being substantially logarithmically related to said fourth current translator; and a second differential amplifier having (i) a second differential amplifier output, (ii) a third differential amplifier input of high impedance electrically connected to said third electrical load to respond to said third load output voltage, and (iii) a fourth differential amplifier input of high impedance electrically connected to said fourth electrical load to respond to said fourth load output voltage, said second differential amplifier providing a second differential amplifier output signal at said second differential amplifier output which is substantially linearly related to differences between said third and fourth load output voltages for said third and fourth load output voltage differences being sufficiently small but which tends to provide one or more second output limit signals when said third and fourth load output voltage differences are sufficiently large whereby said second differential output signal is limited in magnitude to a range defined at least in part by said second output limit signals such that differences between said first differential amplifier output signal and said second differential amplifier output signal cannot exceed a selected maximum difference.

3. The apparatus of claim 2 wherein said first voltage regulator means and said first and second current translators together comprise first, second and third bipolar transistors each having an emitter, a base and a collector, said first bipolar transistor having said emitter thereof electrically connected to said first photodiode and having said collector thereof electrically connected to said first electrical load, said second bipolar transistor having said emitter thereof electrically connected to said second photodiode and said collector thereof electrically connected to said second electrical load, and said third bipolar transistor having both said base and said collector thereof electrically connected to both bases of said first and second bipolar transistors.

4. The apparatus of claim 3 wherein said first differential amplifier comprises a first Darlington-connected transistor pair having therein an inner and an outer bipolar transistor and a second Darlington-connected transistor pair having therein an inner and an outer bipolar transistor with each of these transistors having an emitter, a base and a collector, said emitters of said inner transistors being electrically connected to a current sink and each said base of each said outer bipolar transistor being electrically connected to one of said first and second electrical loads, there being collector-base junction diode means shunting a base-emitter junction of each of said inner bipolar transistors and shunting also said current sink.

5. The apparatus of claim 4 wherein said first and second differential amplifier output signals, after amplification as needed, are supplied to first and second absolute value circuits, respectively, each of said first and second absolute value circuits having an absolute value circuit input to receive a corresponding one of said first and second differential amplifier output signals and each comprising:

an emitter follower pair, said emitter follower pair comprising a first emitter follower bipolar transistor and a second emitter follower bipolar transistor each having an emitter, a base and a collector, said emitters of both said first and second emitter follower bipolar transistors being electrically connected to an output load resistor across which a circuit output signal is obtained, an absolute value circuit differential amplifier comprising a first, second and third differential amplifier bipolar transistors each having an emitter, a base and a collector, said first and second differential amplifier bipolar transistors having said emitters thereof both connected to an absolute value circuit current sink, said third differential amplifier bipolar transistor having said base thereof electrically connected to said first differential amplifier bipolar transistor collector and having said emitter thereof electrically connected to both said second emitter follower bipolar transistor base and said first differential amplifier bipolar transistor base, said absolute value circuit input being electrically connected to both said first emitter follower bipolar transistor base and to said first differential amplifier bipolar transistor base.

6. The apparatus of claim 4 wherein said comparator is provided in a monolithic integrated circuit and signal contributions derived from said second comparator circuit are omitted in a subsequent signal processing circuit which uses signal contributions derived from a plurality of comparator circuits including said first comparator circuit.

7. The apparatus of claim 1 wherein said first voltage regulator means and said first and second current translators together comprise first, second and third bipolar transistors each having an emitter, a base and a collector, said first bipolar transistor having said emitter thereof electrically connected to said first photodiode and having said collector thereof electrically connected to said first electrical load, said second bipolar transistor having said emitter thereof electrically connected to said second photodiode and said collector thereof electrically connected to said second electrical load, and said third bipolar tansistor having both said base and said collector thereof electrically connected to both bases of said first and second bipolar transistors.

8. The apparatus of claim 1 wherein said first differential amplifier comprises a first Darlington-connected transistor pair having therein an inner and an outer bipolar transistor and a second Darlington-connected transistor pair having therein an inner and an outer bipolar transistor with each of these transistors having an emitter, a base and a collector, said emitters of said inner transistors being electrically connected to a current sink and each said base of each said outer bipolar transistor being electrically connected to one of said first and second electrical loads, there being collector-base junction diode means shunting a base-emitter junction of each of said inner bipolar transistors and shunting also said current sink.

9. A photodiode comparator circuit, for monolithic integrated circuit construction, to compare electromagnetic radiation intensities occurring at photodiodes over a range of electromagnetic radiation intensities, said circuit providing a precise comparison indication of intensity differences occurring at said photodiodes when said intensity differences are relatively small but providing a limited comparison range to limit said comparison indication of said intensity differences when said intensity differences are relatively large, said comparator circuit comprising:

the substrate of semiconductor material with a first conductivity type having thereon a layer of semiconductor material of a second conductivity type, said layer being in a substantially crystalline structure with said substrate and said layer having portions thereof electrically isolated from one another to form a plurality of isolated regions in said layer;

first and second of said isolated regions having geometrical shapes closely similar to one another to serve as cathodes for first and second photodiodes, respectively, with said first and second photodiodes each being provided by semiconductor junctions occurring at least in part between each of said first and second isolated regions and said substrate, respectively;

first, second and third bipolar transistors having geometrical shapes closely similar to one another and formed in a third, fourth and fifth of said isolated regions, all adjacent to one another, each of said first, second and third bipolar transistors having an emitter, a base and a collector, said first bipolar transistor emitter being electrically connected to said first isolated region, said second bipolar transistor emitter being electrically connected to said second isolated region and both said third bipolar transistor base and collector being connected to both said first and second bipolar transistor bases with said third bipolar transistor emitter being electrically connected to said substrate; and $2n$ diode means having geometrical shapes closely similar to one another provided in close proximity to one another in said monolithic integrated circuit with each said diode means having an anode and a cathode, $n$ of said diode means being in a first series string with intermediate said diode anodes being electrically connected to intermediate said diode cathodes and with that remaining said diode cathode which is electrically unconnected in said first series string being electrically connected to said first bipolar transistor collector, and $n$ of said diode means being in a second series string with intermediate said diode anodes being electrically connected to intermediate said diode cathodes and with that remaining said diode cathode which is electrically unconnected in said second series string being electrically connected to said second bipolar transistor collector.

10. The apparatus of claim 9 wherein said comparator circuit also comprises a comparator differential amplifier comprising fourth, fifth, sixth and seventh bipolar transistors formed in a fourth, fifth, sixth and seventh of said isolated regions, all adjacent to one another, each of said fourth through seventh bipolar transistors having an emitter, a base and a collector; said fourth and fifth bipolar transistors forming a Darlington-connected pair and said sixth and seventh bipolar transistors also forming a Darlington-connected pair with emitters of said fifth and sixth bipolar transistors being electrically connected to a current sink, said fourth bipolar transistor base being electrically connected to said first bipolar transistor collector and said seventh bipolar transistor base being electrically connected to said second bipolar transistor base.

11. The apparatus of claim 10 wherein said diode means are each formed by a bipolar transistor having a collector and a base thereof directly connected to one another.

12. The apparatus of claim 10 wherein a first differential amplifier diode means is electrically connected between said fifth transistor base and said substrate and a second differential amplifier diode means is connected between said sixth transistor base and said substrate, said first and second differential amplifier diode mean being in close proximity to said fifth and sixth bipolar transistors to thereby receive approximately equal amounts of electromagnetic radiation thereon.

13. An absolute value circuit having an input and an output, said circuit comprising;
an emitter follower pair, said emitter follower pair comprising a first emitter follower bipolar transistor and a second emitter follower bipolar transistor each having an emitter, a base and a collector, said emitters of both said first and second emitter follower bipolar transistors being electrically connected to an output load resistor and to said output; and
an absolute value circuit differential amplifier comprising a first, second and third differential amplifier bipolar transistors each having an emitter, a base and a collector, said first and second differential amplifier bipolar transistors having said emitters thereof both connected to a current sink, said third emitter follower bipolar transistor having said base thereof being electrically connected to said first differential amplifier bipolar transistor collector and having said emitter thereof electrically connected to both said second emitter follower bipolar transistor base and said first differential amplifier bipolar transistor base, said input being electrically connected to both said first emitter follower bipolar transistor base and to said first differential amplifier bipolar transistor base.

* * * * *